(12) United States Patent
Chan et al.

(10) Patent No.: US 10,038,682 B2
(45) Date of Patent: Jul. 31, 2018

(54) SYSTEM AND METHOD FOR COMMUNICATING BETWEEN DISTRIBUTED APPLICATIONS AND DATABASES

(71) Applicant: American Express Travel Related Services Company, Inc., New York, NY (US)

(72) Inventors: Manli Chan, Parkland, FL (US); Tapan Ganguly, Phoenix, AZ (US); Chandler C. Helmuth, Phoenix, AZ (US); Celia S. Hibbert Nelson, Coral Springs, FL (US); Gabriel A. Jimenez, Miami Lakes, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 151 days.

(21) Appl. No.: 14/880,772

(22) Filed: Oct. 12, 2015

(65) Prior Publication Data

US 2017/0104742 A1    Apr. 13, 2017

(51) Int. Cl.
*H04L 29/06* (2006.01)
*G06F 21/62* (2013.01)
*H04L 29/08* (2006.01)

(52) U.S. Cl.
CPC .......... *H04L 63/08* (2013.01); *G06F 21/6218* (2013.01); *H04L 67/02* (2013.01)

(58) Field of Classification Search
CPC ...... H04L 63/08; H04L 67/02; G06F 21/6218
See application file for complete search history.

(56) References Cited

U.S. PATENT DOCUMENTS

| | | | |
|---|---|---|---|
| 6,539,398 B1 * | 3/2003 | Hannan | G06F 17/30 |
| 2003/0172020 A1 * | 9/2003 | Davies | G06Q 40/06 |
| | | | 705/36 R |
| 2003/0182461 A1 * | 9/2003 | Stelting | G06Q 99/00 |
| | | | 719/310 |
| 2006/0259604 A1 * | 11/2006 | Kotchavi | H04L 41/0226 |
| | | | 709/223 |
| 2007/0094283 A1 * | 4/2007 | Fung | H04L 12/66 |
| 2007/0294336 A1 * | 12/2007 | Pounds | G06Q 30/0251 |
| | | | 709/203 |

OTHER PUBLICATIONS

IBM Information Management System Version 13.1 Application Programming Documentation, 2013.*

* cited by examiner

*Primary Examiner* — Robert Leung
*Assistant Examiner* — Thomas Ho
(74) *Attorney, Agent, or Firm* — Snell & Wilmer, L.L.P.

(57) ABSTRACT

A JBoss application may allow for a distributed application hosted on a JBoss application server to connect to a hierarchical type database. Additionally, the JBoss application may communicate via IMS Connect and Open Database Manager Common Service Layers in order to retrieve the data from the IMS databases. A Java framework may be installed on the JBoss application server.

14 Claims, 2 Drawing Sheets

SYSTEM AND METHOD FOR COMMUNICATING BETWEEN DISTRIBUTED APPLICATIONS AND DATABASES

FIELD

The present disclosure relates to communications between distributed applications and databases.

BACKGROUND

Distributed applications typically invoke mainframe Information Management System ("IMS") transactions in order to access IMS data stores. IMS is a hierarchical database management system that controls data for databases in IBM mainframes. Information Management System/Database ("IMS/DB") is the back end database part of IMS, and either Information Management System/Transaction Manager ("IMS/TM") or Customer Information Control System ("CICS") provides the front end online interaction.

The distributed applications may communicate to the mainframe databases by placing a message on a queue that the transaction will pick up and then use this request to obtain the necessary data. However, it may be desirable to eliminate the need to invoke a mainframe transaction, and instead make a call directly to the IMS data store.

SUMMARY

A system, method, and/or computer readable medium (collectively, the "system") is disclosed for communicating between a JBoss Enterprise Application Platform and an IMS database. A web service handler may receive a request and may authenticate the request. The web service handler may invoke an instance of a business delegate and may pass the request to the business delegate. The business delegate may invoke the instance from a data access object. The data access object may transmit a database request to an IMS database.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A JBoss application may allow for a distributed application hosted on a JBoss application server to connect to a hierarchical type database. Additionally, the JBoss application may communicate via IMS Connect and Open Database Manager Common Service Layers in order to retrieve the data from the IMS databases. A Java framework may be installed on the JBoss application server.

Figure 1:
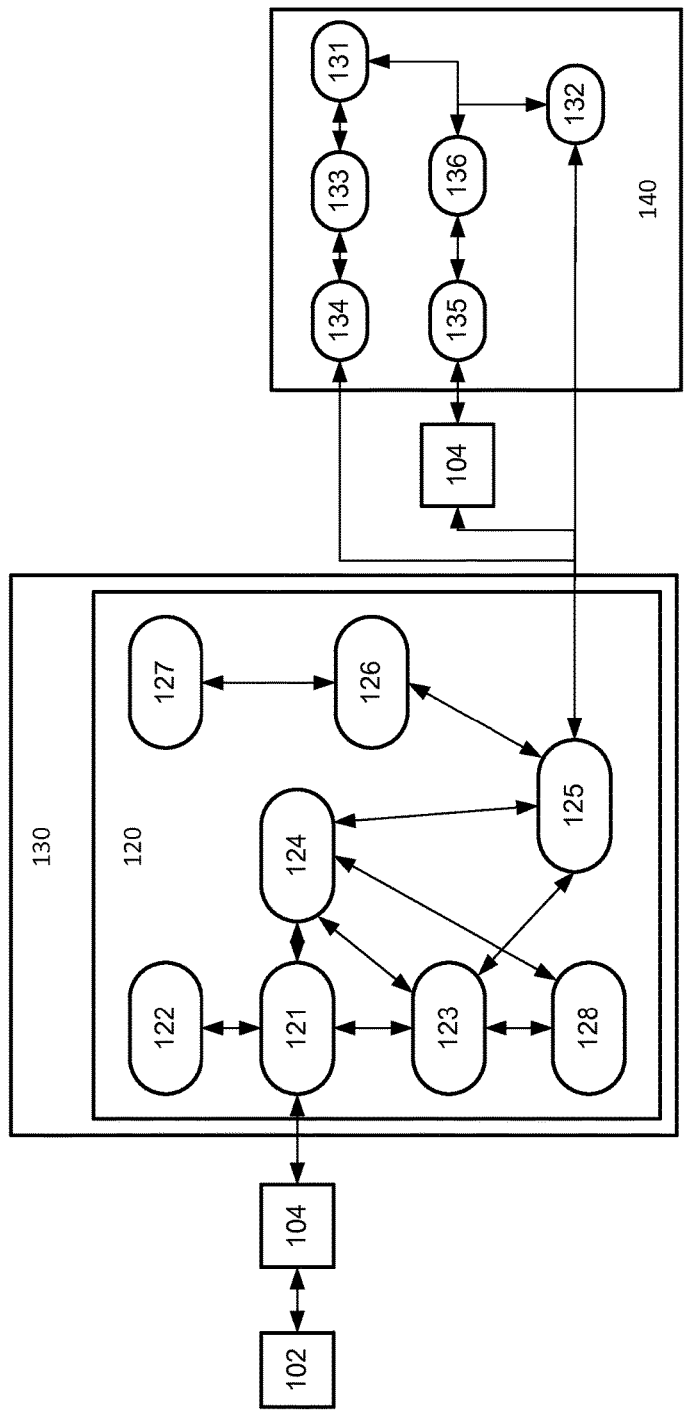
FIG. 1 illustrates an exemplary system for communicating between a JBoss Enterprise Application Platform and an IMS database, in accordance with various embodiments.

Referring to FIG. 1, a system 100 for communicating between distributed applications and IMS databases is illustrated, according to various embodiments. The system may comprise one or more distributed consumers 102. The distributed consumers 102 may use a web client to interact with the system 100. In various embodiments, the distributed consumers 102 may comprise customer service representatives. For example, a customer service representative may be on the phone with a consumer, and the customer service representative may utilize a web client to retrieve or modify data regarding the consumer, such as the balance of a transaction account or the date of a payment. However, the consumers 102 may comprise any entity which desires to interact with an IMS database.

The distributed consumers 102 may transmit requests through a middleware broker 104, such as IBM DataPower. In various embodiments, the distributed consumer 102 may transmit requests using at least one of SOAP or MQ. The middleware broker 104 may communicate with a web application server 120. In various embodiments, the web application server 120 may be hosted on a cloud 130, which may be a private cloud. The web application server 120 may be hosted on a JBOSS Enterprise Application Platform.

The web application server ("WAS") 120 may comprise a web service handler 121. The web service handler 121 may be a mechanism for intercepting a message in both the request and response of a web service. The WAS 120 may comprise an authentication framework 122. The authentication framework may assist the web service handler 121 in authenticating a request. The WAS 120 may comprise a spring container 123. The spring container 123 provides a means of configuring and managing Java objects called beans using reflection. The WAS 120 may comprise a business delegate 124. The business delegate 124 acts as a client-side business abstraction. The business delegate 124 may provide an abstraction for, and thus hide, the implementation of the business services. Using a business delegate 124 may reduce the coupling between presentation-tier clients and the system's business services.

The WAS 120 may comprise a data access object ("DAO") 125. The DAO 125 may be an object that provides an abstract interface to some type of database or other persistence mechanism. By mapping application calls to the persistence layer, the DAO 125 provides some specific data operations without exposing details of the database. The WAS 120 may comprise a database handler 126. The database handler 126 may assist the DAO 125 to establish a data source connection. The WAS 120 may further comprise one or more Java Database Connectivity ("JDBC") drivers 127. The JDBC driver 127 may be a programming interface that lets Java applications access a database via the SQL language.

The WAS 120 may be in communication with a database tier 140. The database tier 140 may comprise at least one of an Information Management System ("IMS") database 131 or a DB2 database 132. IMS is an IBM hierarchical database management system ("DBMS") for IBM mainframes. DB2 is a full-featured SQL-based relational DBMS. The database tier 140 may comprise an object database management system ("ODBM") 133. The ODBM 133 may translate SQL queries to DL/I type queries. The database tier 140 may comprise IMS Connect 134. IMS Connect 134 is an integrated TCP/IP gateway for IMS. IMS connect 134 allows user-written applications to access IMS data and transaction services from any TCP/IP client.

The database tier 140 may further comprise an IMS OTMA facility 135. The IMS OTMA facility 135 may be a transaction-based connectionless client/server protocol that runs on IMS Version 5.1 or later. The IMS OTMA facility 135 may function as an interface for host-based communications servers accessing IMS TM applications through the z/OS® Cross Systems Coupling Facility ("XCF"). The DAO 125 may communicate with the IMS OTMA facility 135 via a middleware broker 140 to call external modules 136.

The various system components may communicate over a network. As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

Figure 2:
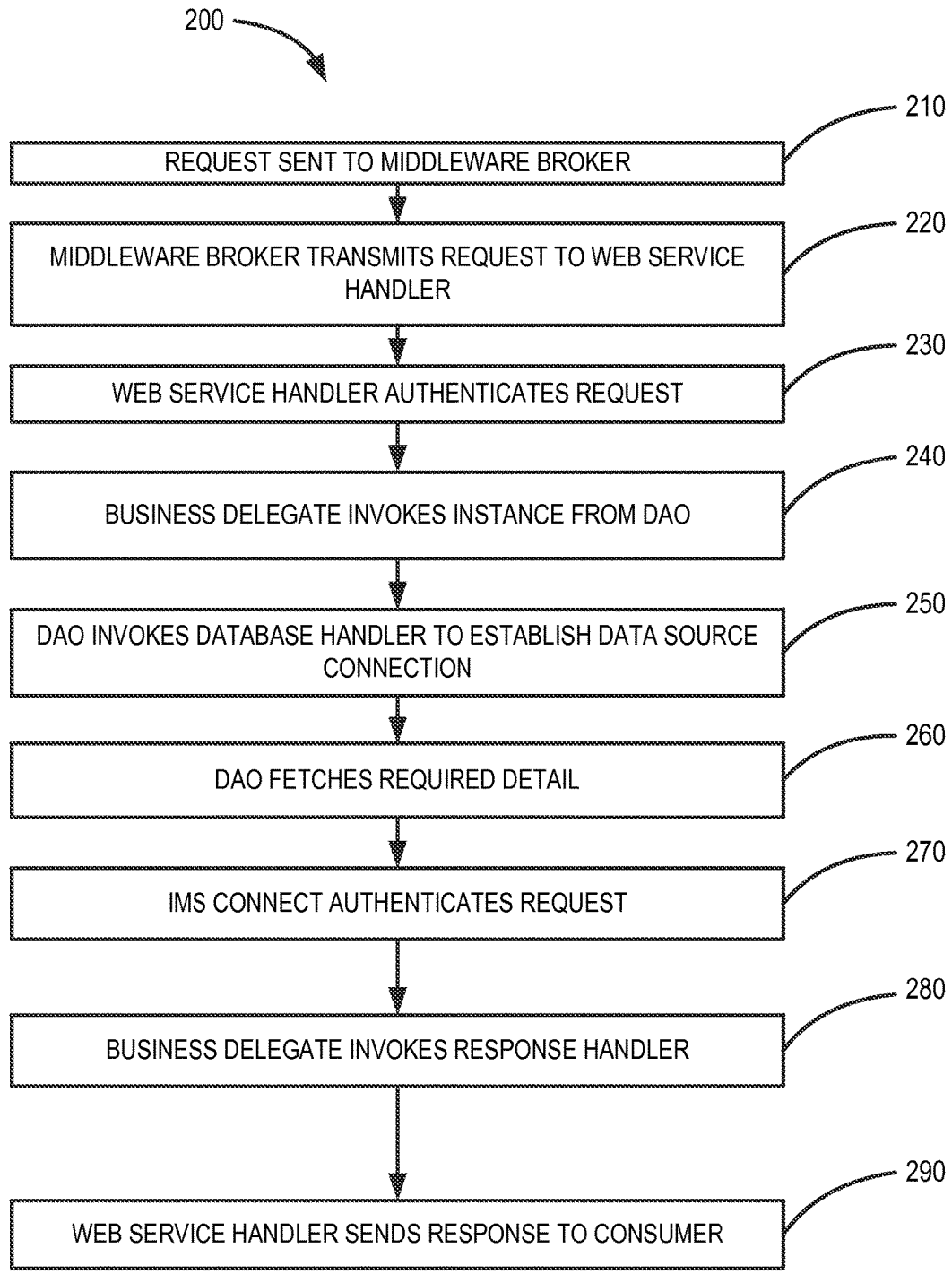
FIG. 2 illustrates an exemplary process for communicating between a JBoss Enterprise Application Platform and an IMS database, in accordance with various embodiments.

Referring to FIG. 2, a process 200 for retrieving data is illustrated, according to various embodiments. A client may send a request as a web service and/or in a message queue ("MQ") to a middleware broker such as IBM Datapower (step 210). The middleware broker may transmit the request to a web service handler (step 220). The web service handler may authenticate the request and determine what operations are used based on the calling operation (step 230). The web service handler may get an instance of business delegate from the spring container and pass the request to the business delegate. An instance may refer to a member of a class.

The business delegate may invoke the instance from the DAO to perform any database related operation, such as search, insert, or delete (step 240). The DAO may invoke the database handler to establish the data source connection (step 250). The database handler may get the connection from the IMS or DB database. The DAO may execute the provided query to fetch the required detail (step 260). The database request may be sent to the IMS or DB database. In various embodiments, the DAO may send web service requests to a message broker to call external modules on the mainframe or for a GeoAccount service.

For requests sent to the IMS database, the IMS Connect may authenticate the consuming application's request and send the request to the ODBM (step 270). The ODBM may translate SQL queries to DL/I type queries. The ODBM may rout the request to specific IMS databases.

Once the DAO obtains the requested data, the response handler may be by invoked by the business delegate (step 280). The response handler may perform all business logic and formatting required by the client. The response handler may then return the business object to the business delegate. The business delegate may send the business object to the web service handler. The Web Service Handler may send the response to the consumer (step 290).

In various embodiments, the data stored in the various databases may comprise a collection of data including and/or originating from customer information, transaction information, account information, record of sales, account history, customer history, sensor data, machine log data, data storage system, public web data, and/or social media. Data may be collected from multiple sources and amalgamated into a big data structure such as a file, for example. In that regard, the data may be used as an input to generate metadata describing the big data structure itself as well as the data stored in the structure.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing, which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a web service handler on a web application server on a private cloud network, a request;
   authenticating, by the web service handler, the request;
   invoking, by the web service handler, an instance of a business delegate on the private cloud network;
   passing, by the web service handler, the request to the business delegate,
   wherein the business delegate invokes the instance from a data access object on the private cloud network;
   invoking, by the data access object, a database handler on the private cloud network to establish a data source connection; and
   executing, by the data access object, the request,
   wherein the data access object transmits a database request to a hierarchical database management system database,
   wherein the database request is authenticated by an integrated TCP/IP gateway,
   wherein the integrated TCP/IP gateway transmits the database request to an object database management system, and
   wherein the object database management system translates the database request from structured query language to data language interface.

2. The method of claim 1, further comprising receiving a response from the hierarchical database management system database.

3. The method of claim 2, further comprising invoking a response handler on the private cloud network to perform business logic on the response.

4. The method of claim 3, further comprising returning the response to the business delegate.

5. The method of claim 4, further comprising sending the response to a consumer.

6. A private cloud network, comprising:
   a processor for a web service handler on the private cloud network,
   a tangible, non-transitory memory configured to communicate with the processor, the tangible, non-transitory memory having instructions stored thereon that, in response to execution by the processor, cause the computer-based system processor to perform operations comprising:
   receiving, by the web service handler, a request;
   authenticating, by the web service handler, the request;
   invoking, by the web service handler, an instance of a business delegate;
   passing, by the web service handler, the request to the business delegate,
   wherein the business delegate invokes the instance from a data access object on the private cloud network,
   wherein the data access object is configured to invoke a database handler on the private cloud network to establish a data source connection,
   wherein the data access object is configured to invoke the request,
   wherein the data access object transmits a database request to a hierarchical database management system database,
   wherein the database request is authenticated by an integrated TCP/IP gateway,
   wherein the integrated TCP/IP gateway transmits the database request to an object database management system, and
   wherein the object database management system translates the database request from structured query language to data language interface.

7. The web service handler of claim 6, further comprising receiving a response from the hierarchical database management system database.

8. The web service handler of claim 7, further comprising invoking a response handler on the private cloud network to perform business logic on the response.

9. The web service handler of claim 8, further comprising returning the response to the business delegate.

10. The web service handler of claim 9, further comprising sending the response to a consumer.

11. An article of manufacture including a non-transitory, tangible computer readable storage medium having instructions stored thereon that, in response to execution by a web application server on a private cloud network, cause the web application server to perform operations comprising:
    receiving, by a web service handler on the private cloud network, a request;

authenticating, by the web service handler, the request;
invoking, by the web service handler, an instance of a business delegate on the private cloud network;
passing, by the web service handler, the request to the business delegate,
wherein the business delegate invokes the instance from a data access object on the private cloud network;
invoking, by the data access object, a database handler on the private cloud network to establish a data source connection; and
executing, by the data access object, the request,
wherein the data access object transmits a database request to a hierarchical database management system database,
wherein the database request is authenticated by an integrated TCP/IP gateway,
wherein the integrated TCP/IP gateway transmits the database request to an object database management system, and
wherein the object database management system translates the database request from structured query language to data language interface.

12. The article of claim 11, further comprising receiving a response from the hierarchical database management system database.

13. The article of claim 12, further comprising invoking a response handler on the private cloud network to perform business logic on the response.

14. The article of claim 13, further comprising returning the response to the business delegate.

* * * * *